United States Patent [19]

Ngo

[11] Patent Number: 4,894,763
[45] Date of Patent: Jan. 16, 1990

[54] AC-AC CONVERTER USING SWITCHES IN A DC LINK

[75] Inventor: Khai D. T. Ngo, Gainesville, Fla.

[73] Assignee: General Electric Company, Schenectady, N.Y.

[21] Appl. No.: 279,636

[22] Filed: Dec. 5, 1988

[51] Int. Cl.⁴ .............................................. H02J 3/36
[52] U.S. Cl. ....................................... 363/35; 363/37; 318/803
[58] Field of Search ...................... 363/35, 37, 51, 124; 318/376, 767, 800, 801, 802, 803

[56] References Cited

U.S. PATENT DOCUMENTS

| | | | |
|---|---|---|---|
| 4,088,934 | 5/1978 | D'Atre et al. | 318/227 |
| 4,375,612 | 3/1983 | Wirth | 318/767 |
| 4,670,827 | 6/1987 | Schneider | 363/37 |
| 4,788,635 | 11/1988 | Heinrich | 363/35 |
| 4,805,082 | 2/1989 | Heinrich et al. | 363/37 |

OTHER PUBLICATIONS

Bose, B. K., "Power Electronics and AC Drives", Prentice-Hall, Englewood Cliffs, N.J., 1986, pp. 122-152.

Primary Examiner—Peter S. Wong
Attorney, Agent, or Firm—Marvin Snyder; James C. Davis, Jr.

[57] ABSTRACT

A power conversion system for converting polyphase AC power at a first frequency and voltage to AC power at a second frequency and voltage includes an input rectifier circuit and an output inverter circuit coupled by a DC link or interface comprising solid state devices. The interface includes a reversely-poled diodes connected between selected terminals of the rectifier and inverter circuits for carrying current in a forward direction. Controllable switches interconnect the same terminals for carrying current in a reverse direction to the inverter circuit. A controller responds to instantaneous current at the inverter terminals and to instantaneous input line voltages for selectively energizing the interface switches.

8 Claims, 8 Drawing Sheets

AC-AC CONVERTER USING SWITCHES IN A DC LINK

The present invention relates in general to power conversion systems for converting alternating current (AC) electric power at a first frequency and voltage to alternating current electric power at a second frequency and voltage

BACKGROUND OF THE INVENTION

AC-AC converters are known in the art and are useful in a variety of applications. In a typical AC-AC converter, an AC supply voltage is rectified and the resultant rectified direct current (DC) voltage is converted to a variable frequency AC voltage by an inverter. Electric power is coupled between the inverter and rectifier through what is commonly referred to as a DC link. In most converter systems, the DC link includes a serially-connected inductor and shunt capacitor which act as an LC filter. The use of such filter permits use of simpler drive circuitry for switches in the rectifier and inverter circuits. However, the size of the inductor in such DC link tends to be bulky if the system is designed to operate at low switching frequencies. In addition to the filtering capability of the inductor-capacitor DC link, such link also allows bi-directional power flow and effectively isolates the switching action in the rectifier circuit from that of the inverter circuit. The primary disadvantage of such inductive filter for a DC link is the large size of the inductor and the system performance detriments resulting from use of large reactive elements. Thus it is desirable to employ a DC link which effectively isolates the rectifier and inverter portions of the converter system but avoids the large and bulky size of reactive elements and the performance detriments attributable to such elements.

OBJECTS OF THE INVENTION

One object of the invention is to provide an electric power conversion system which utilizes a DC link but avoids any necessity for incorporating reactive components in the link.

A further object of the invention i to provide an electric power conversion system utilizing a DC link between a rectifier and an inverter, which incorporates only solid state components.

A still further object of the invention is to provide an electric power conversion circuit having a DC link comprised only of solid state devices while providing the same advantages as a reactive DC link without the detriments that accompany use of large size reactive elements.

SUMMARY OF THE INVENTION

The above and other objects and advantages of the invention are achieved in one form by an electric power conversion system for converting polyphase AC electric power at a first frequency and voltage to AC electric power at a second frequency and voltage, in which a polyphase rectifier and a polyphase inverter are interconnected through a DC link. The polyphase rectifier includes input terminals for connection to a source of polyphase electric power and includes first and second output terminals providing rectified electric power to the DC link. The polyphase inverter has first and second input terminals for connection to the DC link and includes plural output terminals for connection to a load. The DC link includes first and second unidirectional current-carrying devices connected between corresponding input and output terminals of the inverter and rectifier circuit, respectively. The unidirectional devices are oppositely poled so that one device conducts current in a first direction while the other conducts current in an opposite direction. First and second controllable switches are also provided and arranged to cross-couple the respective output terminals of the rectifier circuit to the input terminals of the inverter circuit such that current may flow between different terminals of the inverter circuit than is normally provided through the unidirectional current carrying devices. Control means are coupled to monitor both the instantaneous direction of current at the inverter input terminals and the polarity of the input line voltages, and to control the switching means so as to interconnect the output and input terminals of the rectifier and inverter circuit, respectively, to assure that current from the rectifier circuit maintains its unidirectional character, while allowing current to reverse direction at the input terminals of the inverter circuit and maintaining the unipolar characteristic of the inverter input voltage. In a preferred embodiment, the unidirectional devices comprise solid state diodes and the controllable switch means comprise field-effect transistors. The current is monitored at one of the input terminals of the inverter circuit by a current monitor which supplies a signal to a control circuit which, in turn, supplies gating signals to the field-effect transistors.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
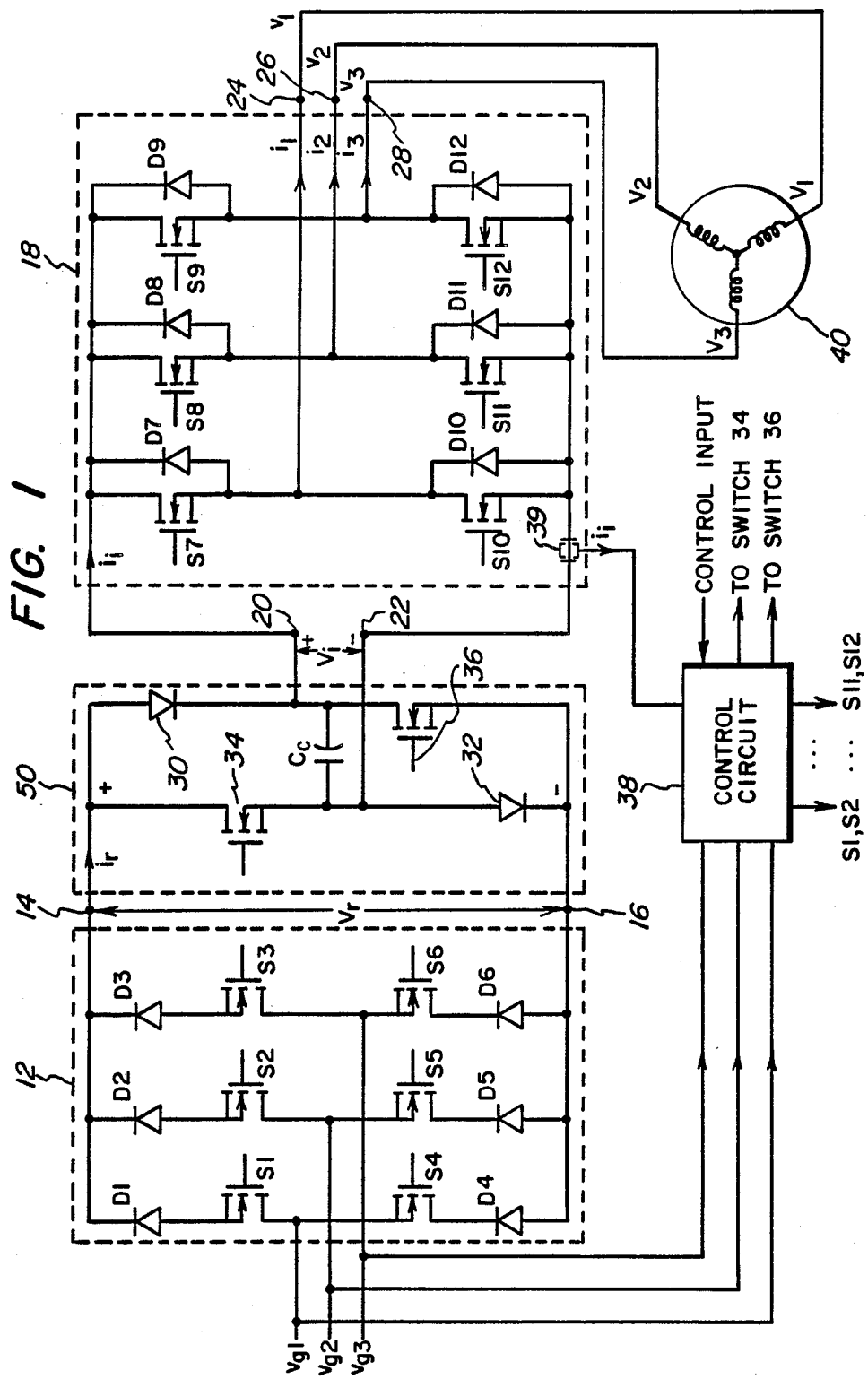
FIG. 1 is a simplified circuit diagram of one form of alternating current electric power conversion system incorporating the teaching of the present invention.

FIG. 1 illustrates one form of electric power conversion system incorporating the present invention. The system employs a polyphase (three-phase) rectifier circuit 12 of a type well known in the art. The rectifier circuit includes a matrix of controllable switches S1–S6 which are selectively controlled to produce a DC voltage between output terminals 14, 16 of the rectifier circuit. As illustrated, terminal 14 is generally a positive voltage terminal while terminal 16 is a negative voltage terminal.

Each of switches S1–S3 is connected to positive voltage terminal 14 by corresponding diode rectifiers D1–D3, respectively, while each of switches S4–S6 is connected to negative voltage terminal 16 by corresponding diode rectifiers D4–D6, respectively. This arrangement of switches and rectifiers simplifies the drive or gate controls for switches S1–S6 since, even though the switch matrix is operable through four quadrants, each individual switch does not operate in a four quadrant mode; i.e., the individual switches do not have to both carry AC current and block AC voltage. Operation of such polyphase rectifier circuits and control systems for controlling their operation are well known in the art and hence not described herein.

A polyphase inverter circuit 18 includes a plurality of switches S7–S12 which are selectively gated into conduction for inverting a rectified voltage at the inverter input terminals 20 and 22 into AC power at output terminals 24, 26 and 28. In its simplest form, inverter circuit 1S includes switches S7–S12 with shunt or flyback diodes D7–D12, each flyback diode connected in parallel with a corresponding one of the switches. It should be noted that the inverter circuit is designed to operate in a four quadrant mode although each individual inverter switch is arranged to carry alternating current while blocking unipolar voltage. This arrangement simplifies the mode of control for the inverter circuit. Such inverter circuits and controls for them are well known in the art and hence no further description herein is necessary. See, for example, B. K. Bose, "Power Electronics and AC Drives", Prentice-Hall, Englewood Cliffs, New Jersey, 1986, pages 122–152.

In most power conversion systems, rectifier circuit 12 would be coupled to inverter circuit 18 by means of a DC link comprising a series inductor and a shunt capacitor. See, for example, the power conversion system illustrated in D'Atre et al. U.S. Pat. No. 4,088,934, issued May 9, 1978 and assigned to the instant assignee. The present invention avoids need for this reactive DC link by employing instead a switching interface 50 comprising a first diode 30 coupling terminal 14 to terminal 20 and a second diode 32 coupling terminal 22 to terminal 16. Diodes 30 and 32 are oppositely poled so as to permit conventional current flow from terminal 14 to terminal 20 and from terminal 22 to terminal 16. Switching interface 50 further includes a switching device 34 coupled between terminals 14 and 22 and an additional switching device 36 coupled between terminals 20 and 16. Switching devices 34 and 36 are preferably field effect transistors, while diodes 30 and 32 ar preferably solid state devices. Interface 50 is sometimes referred to by the conventional term "DC link".

In general, the rectifier output voltage $V_r$ between terminals 14 and 16 may be AC since the rectifier switch configuration is capable of generating instantaneous AC voltage. The inverter input voltage $v_i$ between terminals 20 and 22 must, however, be DC voltage of the polarity indicated since the inverter switch configuration permits only the use of DC voltage. Accordingly, interface switches 30, 32, 34 and 36 must be capable of rectifying AC rectifier output voltage into DC inverter input voltage. On the other hand, inverter current $i_i$ may be AC in general but the rectifier current $i_r$ must be DC because of the switch configurations illustrated. Therefore, interface switches 30, 32, 34 and 36 also rectify AC inverter current $i_i$ into DC rectifier current $i_r$. During a forward transfer of power, i.e., from the rectifier to the inverter, rectifier 12 and the interface or DC link switches 30–36 operate conjointly to rectify input voltages $v_{g1}$, $v_{g2}$, $v_{g3}$ of any frequency into a variable DC voltage $v_i$. Voltage $v_i$ is then inverted by inverter 18 into polyphase voltages of variable amplitude and frequency for a load such as, for example, a motor 40. A control circuit 38 monitors current $i_i$ in the DC link at inverter 18 through a current transformer 39 and the polyphase voltages $v_{g1}$, $v_{g2}$ and $v_{g3}$ for controlling switches 34 and 36.

Figure 2A:
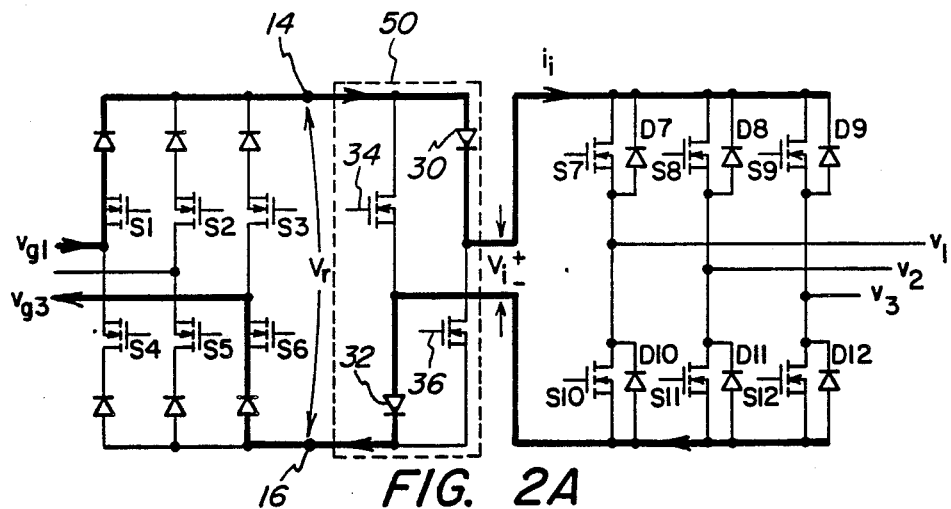
FIGS. 2A and 2B are diagrams essentially identical to a portion of FIG. 1, but show the direction of current flow between the rectifier circuit and the inverter circuit under two separate conditions of operations.
Figure 2B:
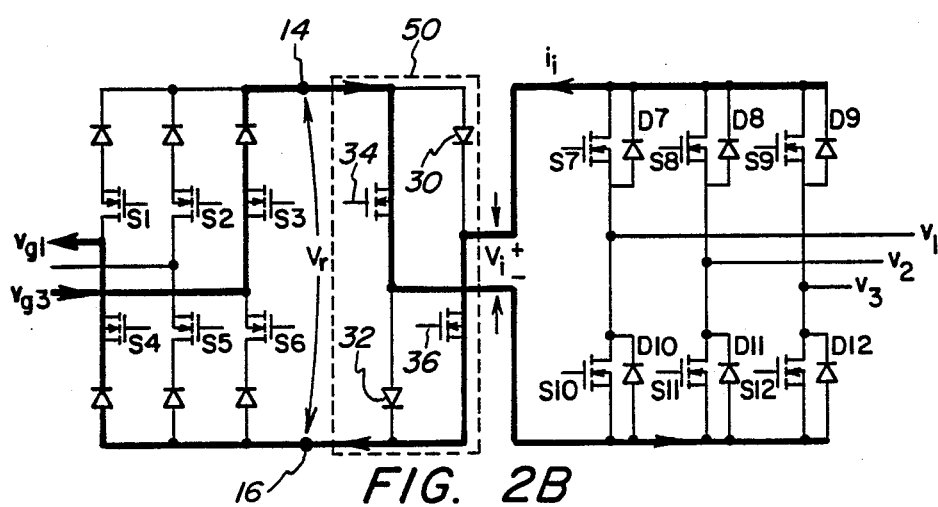
Figure 3:
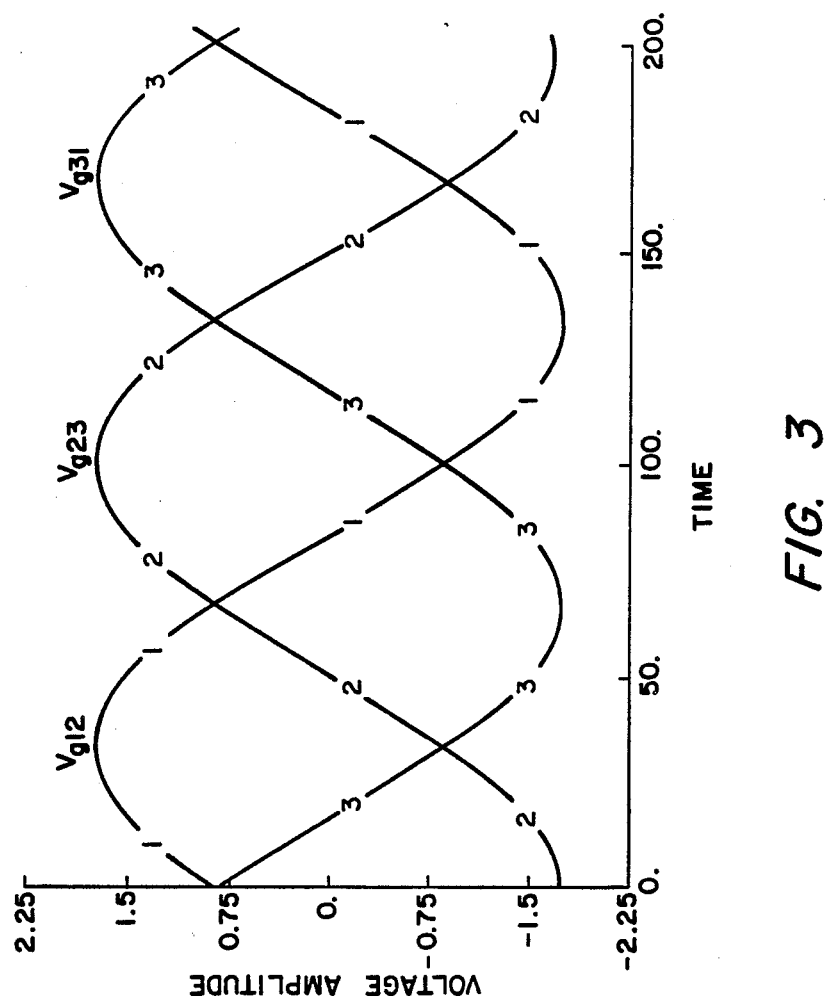
FIG. 3 illustrates three-phase voltage waveforms for power coupled to input terminals of the inventive power conversion system.
Figure 4A:
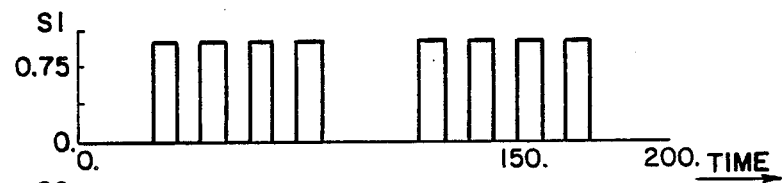
FIGS. 4A-4F illustrate gating signals for controlling switching devices in the rectifier portion of the system of FIG. 1.
Figure 4B:
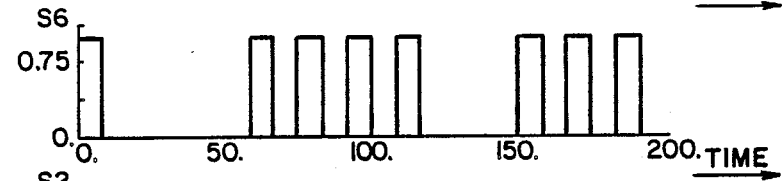
Figure 4C:
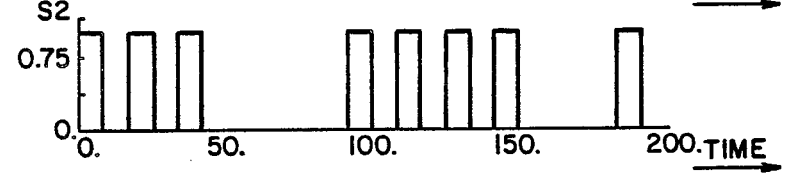
Figure 4D:
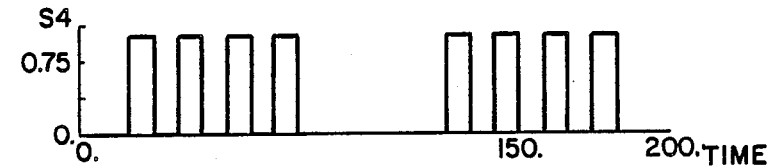
Figure 4E:
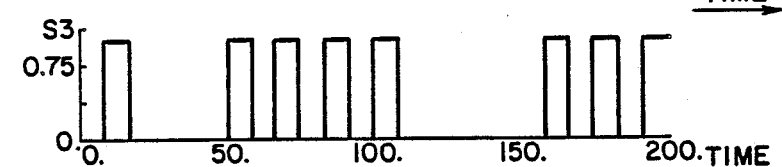
Figure 4F:
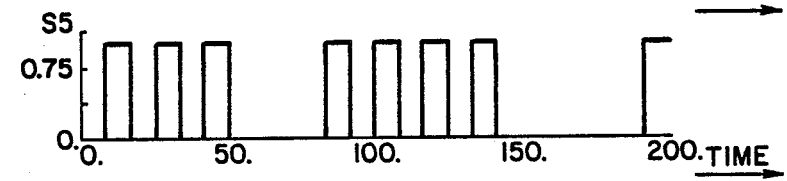

FIGS. 2A and 2B illustrate operation of the inventive power conversion system in two possible modes. Reference should be made to FIG. 3 for illustration of three-phase alternating current waveforms which are applied to input terminals $v_{g1}$, $v_{g2}$ and $v_{g3}$, of rectifier circuit 12. The graphs in FIG. 3 are intended to show the relative voltage amplitudes between phases and are labeled, for example, $v_{g12}$ to indicate difference in voltage between terminals $v_{g1}$ and $v_{g2}$. For simplicity of discussion, the following description of FIGS. 2A and 2B is given at a time when the line-to-line voltage $v_{g13}$ has the highest magnitude among the three line voltages and is selected to energize the DC link or interface 50 between rectifier circuit 12 and inverter circuit 18, as identified in FIG. 1. Under the condition in which voltage $v_{g1}$ is greater than voltage $v_{g3}$ and DC link current $i_i$ is greater than or equal to zero, switches S1 and S6 in rectifier circuit 12 are enabled and diodes 30 and 32 are carrying current. The actual current path is indicated by the heavier dark lines in FIG. 2A. In the case in which current $i_i$ is less than zero, switches S3 and S4 are actuated along with DC link switches 34 and 36. This particular case, as shown by the heavier lines in FIG. 2B, demonstrates a reverse current flow from load 40 to the source (not shown) connected to terminals $v_{g1}$ and $v_g$. The particular switches selected for activation by control circuit 38 provide a path for current $i_i$, and also connect input terminal $v_{g1}$ to positive inverter terminal 20 and input terminal $v_{g3}$ to negative inverter terminal 22. This is desirable since the condition assumed above in conjunction with FIG. 2A is terminal $V_{g1}$ is at a positive voltage with respect to terminal $v_{g3}$.

In general, the selection of which interface switches in the DC link carry current is dictated solely by the sign of $i_i$. If:

$i_i \geq 0$, diodes 30 and 32 conduct;

$i_i < 0$, switches 34 and 36 conduct.

Selection of conducting ones of rectifier switches S1–S6 depends on both modulation strategy (e.g., six-stepped, PWM, etc.) and the sign of $i_i$. The modulation strategy determines which two of input phases $v_{g1}$, $v_{g2}$, $v_{g3}$ are to be connected to input terminals 14, 16 of interface 50 (and the trivial case of shorting out $v_r$) Six possibilities arise since there are three input phases to be connected to two (positive and negative) terminals 14, 16. These possibilities are designated $v_{g12}$, $v_{g21}$, $v_{g23}$, $v_{g32}$, $v_{g31}$ and $v_{g13}$, where $v_{g12}$, for example, means that phases $v_{g1}$ and $v_{g2}$ are to be coupled to terminals 14 and 16, respectively.

After the modulation strategy has determined which two input phases are to be connected to terminals 14, 16, the switches S1–S6 associated with these two phases are to be activated. The rectifier switches, as well as the DC link switches, are selected using the polarities of the input line voltages and the inverter input current such that inverter input voltage $v_i$ is always positive. The following table shows how rectifier switches are selected according to modulation strategy and polarity of inverter current:

| $i_i \geq 0$ | $v_{g12}>0$<br>S1,S5 | $v_{g21}>0$<br>S2,S4 | $v_{g23}>0$<br>S2,S6 | $v_{g32}>0$<br>S3,S5 | $v_{g31}>0$<br>S3,S4 | $v_{g13}>0$<br>S1,S6 |
|---|---|---|---|---|---|---|
| $i_i<0$ | S2,S4<br>$v_{g21}<0$ | S1,S5<br>$v_{g12}<0$ | S3,S5<br>$v_{g32}<0$ | S2,S6<br>$v_{g23}<0$ | S1,S6<br>$v_{g13}<0$ | S3,S4<br>$v_{g31}<0$ |

Thus if phases $V_{g3}$ and $v_{g2}$ are selected to be connected to terminals 14 and 16, respectively, where $v_{g32}>0$, and if $i_i \geq 0$, the entry corresponding to column $v_{g32}>0$ and row $i_i>0$ suggests that switches S3 and S5 are activated.

Many variables of the converter can be controlled. Some examples are input power factor, input current harmonics, DC link voltage, output frequency, output voltage amplitude, output harmonics and direction of power flow. Modulation strategies, such as phase-control, six-stepped switching, and pulse-width modulation (PWM), can be used. If six-stepped switching is used, the switching frequency is the same as the input (or output) frequency for the rectifier switches or the same as the output frequency for the inverter switches. More control freedom is available with PWM techniques since the switching frequency is much higher than the input or output frequency.

Figures 5A, 5B, 5C:
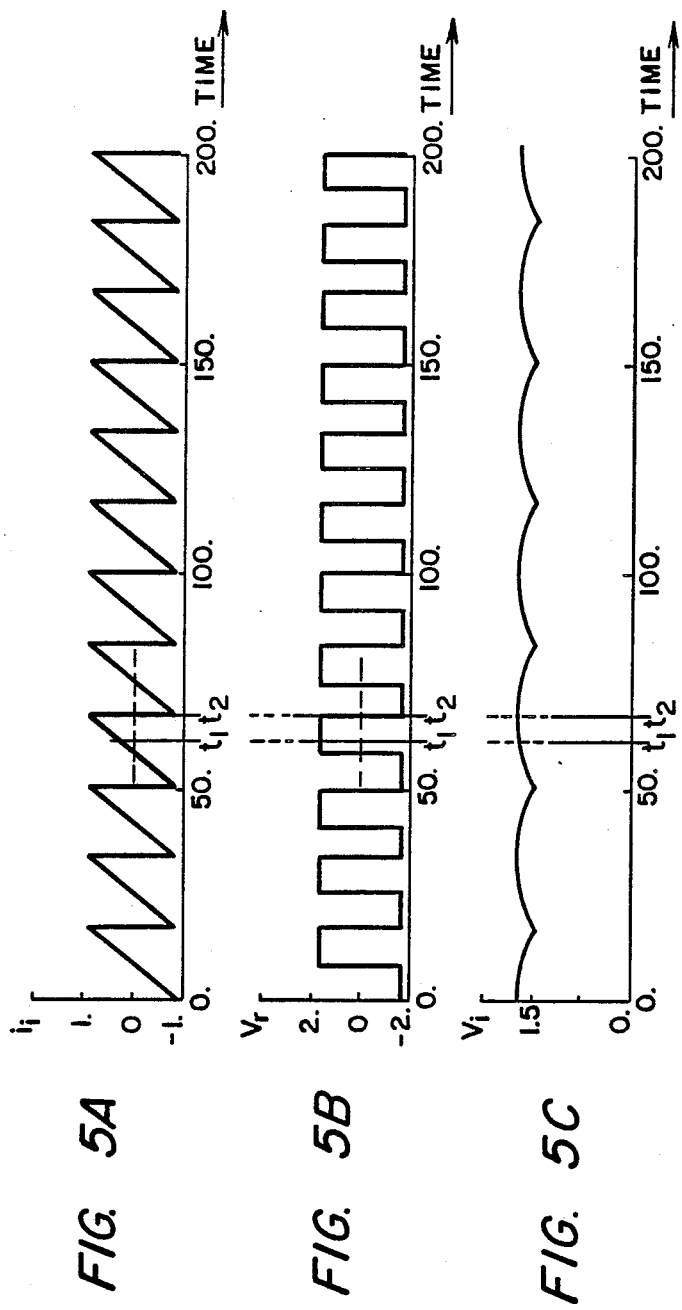
FIGS. 5A-5C illustrate waveforms of inverter current, rectifier output voltage, and inverter input voltage, respectively for the system of FIG. 1.
Figure 6A:
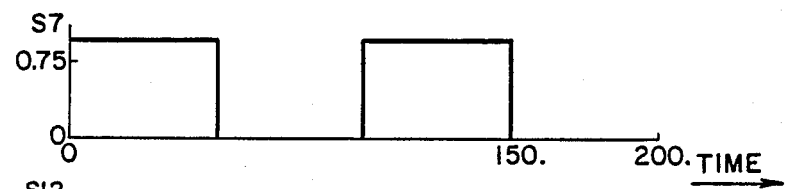
FIGS. 6A-6F illustrate gate drive logic for the inverter circuit of FIG. 1.
Figure 6B:
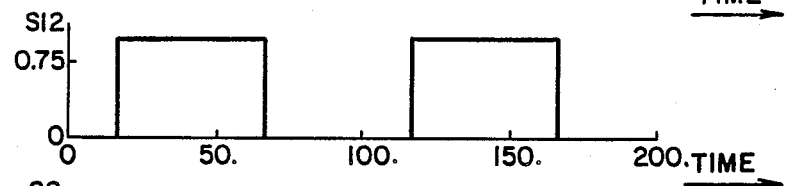
Figure 6C:
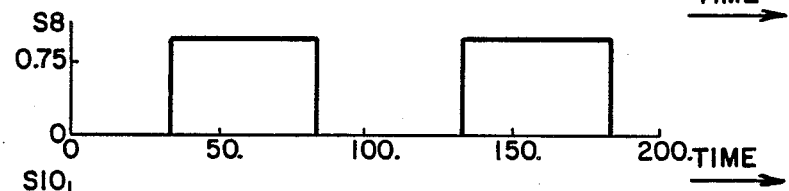
Figure 6D:
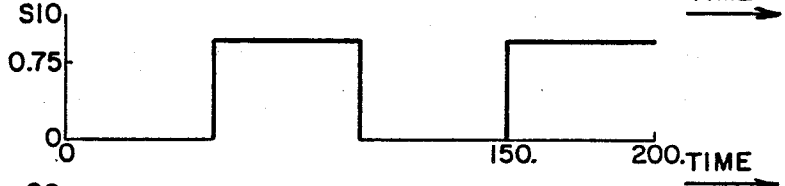
Figure 6E:
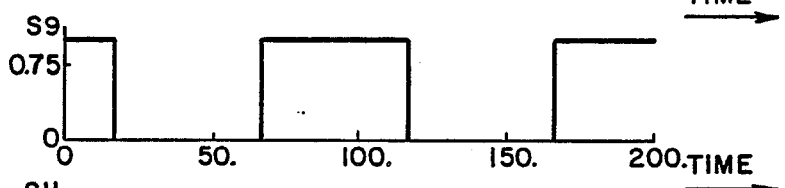
Figure 6F:
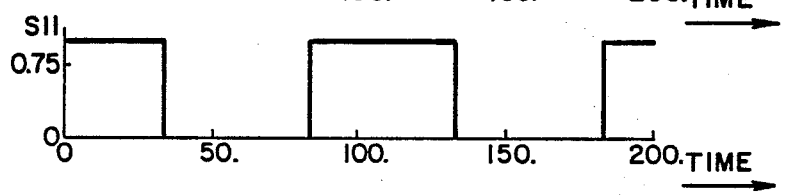

As an example of overall converter operation, consider the switching strategy in which the rectifier and inverter switches are controlled by the six-stepped sequences (to be explained shortly). Referring briefly again to FIG. 3, a set of three-phase input line voltages $v_{g12}$, $v_{g23}$, $v_{g31}$ are shown for one full input cycle. For illustration, a cycle having a period of 200 seconds is used. Selection of the input line voltage that exchanges energy with the load is governed by phase control, with the phase chosen to provide the highest DC link voltage. This selection is combined with the polarity of the inverter input current $i_i$ to generate the drive logic illustrated by the voltage pulses shown on a common time scale in FIGS. 4A–4F, each of the FIGS. representing the pulses supplied to a designated one of the rectifier switches S1–S6, respectively. Each of the pulses shown in FIGS. 4A–4F represents a gate drive pulse applied to the corresponding switch. FIGS. 5A, 5B and 5C illustrate, respectively, the instantaneous magnitude of inverter current $i_i$, rectifier voltage $v_r$ and inverter voltage $v_i$ for the illustrative switching strategy.

Figures 7A, 7B, 7C:
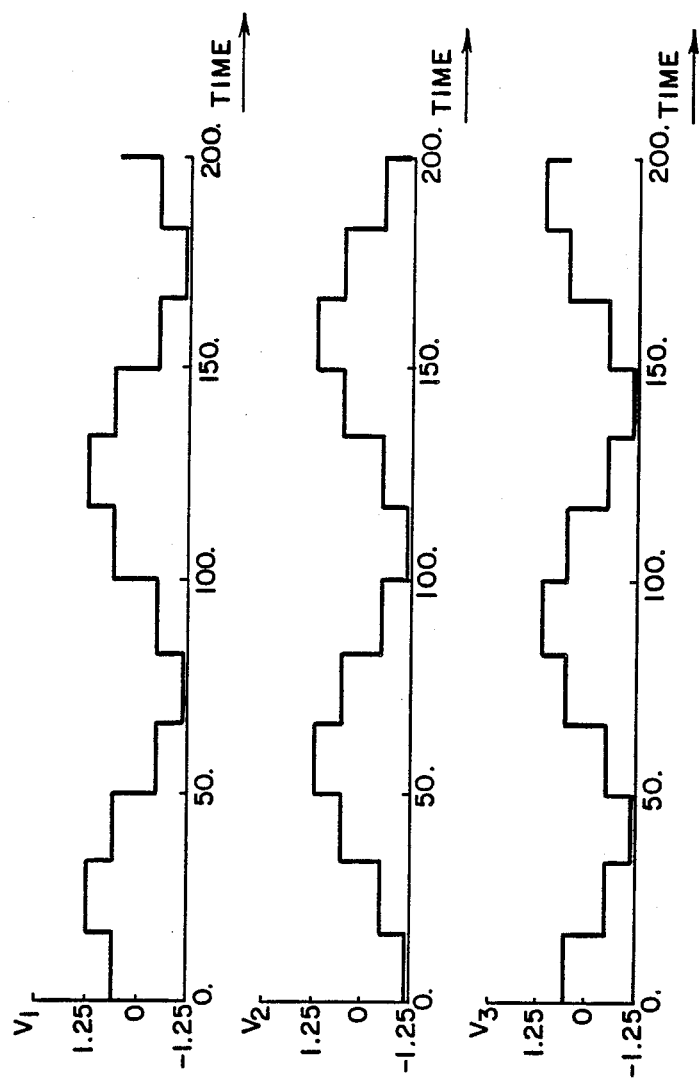
FIGS. 7A-7C illustrate output phase voltage waveforms for the system of FIG. 1.
Figures 8A, 8B, 8C:
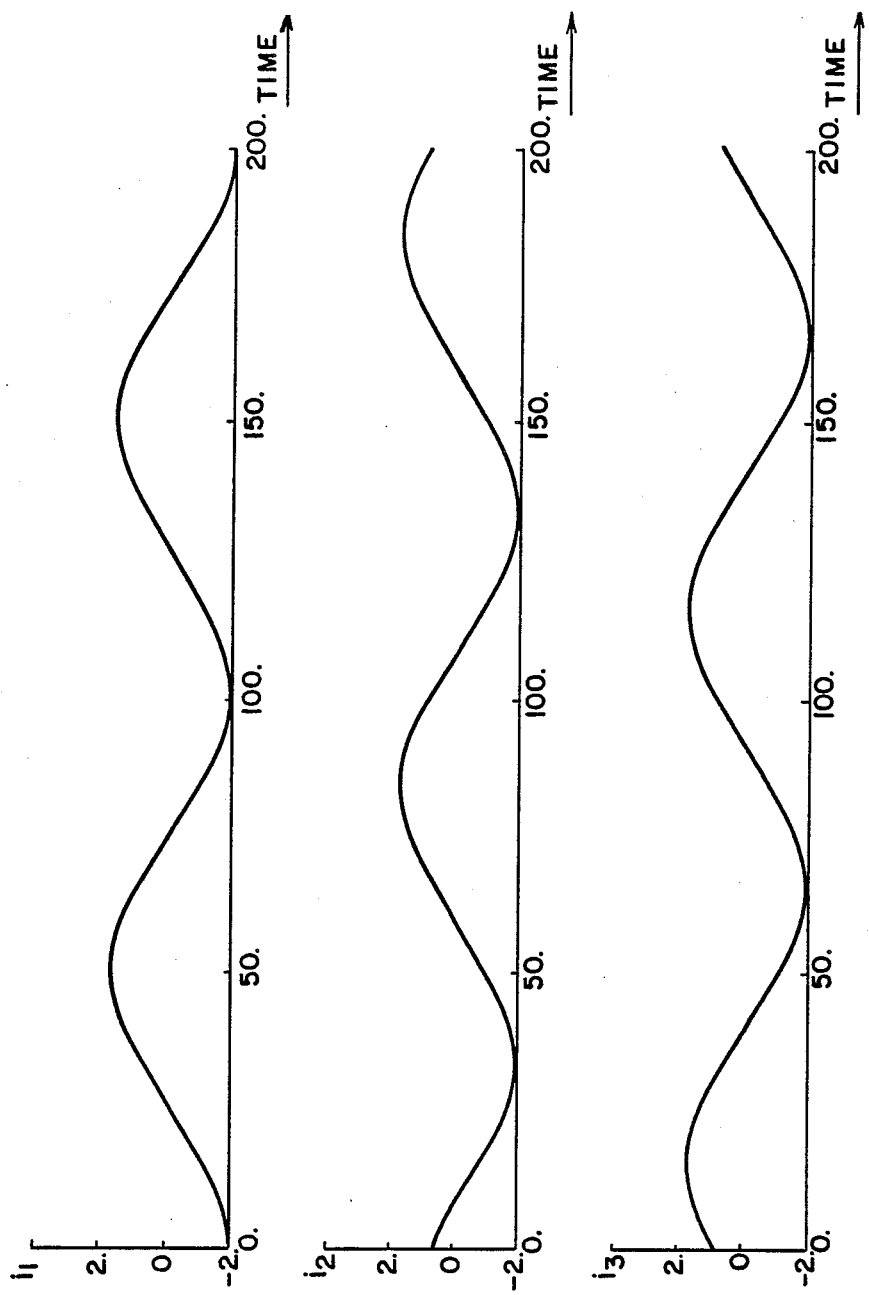
FIGS. 8A-8C illustrate output phase current waveforms for the system of FIG. 1.

Six-stepped switching for inverter switches S7–S12 is illustrated in FIGS. 6–8. The drive logic for the inverter switches is illustrated by the voltage pulses shown on a common time scale in FIGS. 6A–6F. Each of FIGS. 6A–6F represents the pulses supplied to a designated one of the inverter switches S7–S12, respectively. The load comprises three inductors connected in a Y configuration such as would be experienced for three-phase AC motor 40 of FIG. 1 (assumed to be delivering no power). Output phase voltages and currents are shown in FIGS. 7 and 8, respectively, wherein each of the three phases is dealt with separately in FIGS. 7A–7C, respectively, and in FIGS. 8A–8C, respectively.

Typical operation of the inventive power conversion system is illustrated by waveforms $i_i$, $v_r$ and $v_i$ in FIGS. 5A–5C, respectively. At a time $t_1$, line voltage $v_{g13}$ is coupled to rectifier output terminals 14, 16 because its magnitude is highest as shown by FIG. 3. Inverter current $i_i$ is positive. Therefore, the conduction path is formed as shown in FIG. 2A. It can be seen that rectifier voltage $v_r=v_{g13}>0$ and that inverter input voltage $v_i=v_{g13}$. At time $t_2$, switching action in the inverter causes inverter current $i_i$ to reverse, i.e., to become less than zero. After this condition is detected, four different switches S3, S4, 34 and 36 are turned on to form the path shown in FIG. 2B. At this juncture, $v_r=-v_{g13}$ and is less than zero, but the negative $v_r$ voltage is switched by interface 50 to make inverter voltage $v_i=v_{g13}$ and be greater than zero.

The principles of operation given above for the basic circuit in FIG. 1 assumes that timing among all the switches S1–S12, 34 and 36 are in perfect synchronism. In practice, a small amount of time is required in order to detect when inverter current $i_i$ changes sign, to turn off the then-conducting set of switches, and to turn on the next set of switches due to become conductive. Timing mismatch is thus inevitable and can cause commutation voltage spikes. Therefore, a commutation capacitor $C_c$ is included, as shown in FIG. 1, to facilitate commutation. Capacitor $C_c$ is small, since it absorbs only commutation energy during brief switching transients. Filters may also be added at the input and output sides of the converter if necessary to improve voltage and current waveforms of the system.

While the invention has been described in what is considered to be a preferred embodiment, many modifications and changes will become apparent to those having ordinary skill in the art. It is, therefore, to be understood that the appended claims are intended to cover all such modifications and changes as fall within the true spirit of the invention.

What is claimed is:

1. Apparatus for converting polyphase AC electric power at a first frequency and voltage to AC electric power at a second frequency and voltage, comprising:
   a polyphase rectifier having input terminals for connection to a source of polyphase electric power and having a first and a second output terminal for providing rectified electric power;
   a polyphase inverter having first and second input terminals for connection to a source of rectified electric power and having plural output terminals for connection to a load;
   a first unidirectional current-carrying device connected between said first output terminal of said rectifier and said first input terminal of said inverter;
   a second unidirectional current-carrying device connected between said second input terminal of said inverter and said second output terminal of said rectifier, said first and second unidirectional current-carrying devices being poled oppositely to each other;
   first controllable switch means connected between said first output terminal of said rectifier and said second input terminal of said inverter;
   second controllable switch means connected between said first input terminal of said inverter and said second output terminal of said rectifier; and
   control means responsive to instantaneous polarity of current at one of said first and second input terminals of said inverter and to instantaneous polarity of the input line voltages for selectively gating said first and second controllable switch means substantially in synchronism into and out of conduction such that current at said rectifier output terminals is unidirectional regardless of current direction at said inverter input terminals and such that the rectified voltage at said inverter input terminals is maintained unipolar.

2. The apparatus of claim 1 wherein each of said unidirectional current-carrying devices comprises a solid state diode.

3. The apparatus of claim 1 wherein each of said controllable switch means comprises a field effect transistor having a gate terminal connected to said control means for receiving gating signals.

4. In a power conversion system having a rectifier circuit for converting input AC electric power to rectified electric power and having an inverter circuit for converting rectified electric power to output AC electric power, the combination comprising:

a DC link for coupling the rectifier circuit to the inverter circuit, said DC link comprising a pair of synchronously-operable controllable switching means for coupling rectified electric power between the rectifier circuit and the inverter circuit; and control means responsive to instantaneous direction of current at the inverter circuit and to instantaneous polarity of input line voltages for rendering said switching means conductive or nonconductive substantially in synchronism so as to enable said switching means to maintain unidirectional current from the rectifier circuit and unipolar voltage at the input of the inverter circuit.

5. The power conversion system of claim 4, further including a current monitor coupled to an input terminal of said inverter circuit for providing an indication of instantaneous inverter input current direction, and a voltage monitor for sensing the power conversion system input line voltage polarities.

6. The power conversion system of claim 4 wherein the DC link includes first and second oppositely-poled diodes for interconnecting corresponding terminals of the rectifier and inverter circuits.

7. The power conversion system of claim 6 wherein said switching means are arranged to cross-couple said corresponding terminals of the inverter and rectifier circuits.

8. The power coversion system of claim 7 wherein said switching means comprises first and second field effect transistors having source and drain terminals interconnecting selected output terminals of the rectifier circuit to selected input terminals of the inverter circuit.

* * * * *